Patented June 28, 1949

2,474,578

UNITED STATES PATENT OFFICE 2,474,578

CHLORINATED METHYLCHLOROSILANES AND THEIR HYDROLYSIS PRODUCTS

William F. Gilliam, Schenectady, N. Y., assignor to General Electric Company, a corporation of New York No Drawing. Application May 5, 1945, Serial No. 592,289

8 Claims. (Cl. 260—448.2)

1

The present invention relates to novel chemical compounds and to their preparation. The invention is especially concerned with the preparation of (1) novel chloromethylchlorosilanes consisting of a single silicon atom, a silicon-bonded chlorine atom, and a silicon-bonded chloromethyl radical containing from 2 to 3 chlorine atoms attached to the carbon atom of the chloromethyl radical, the two remaining valences of the methylchlorosilane being satisfied by members selected from the class consisting of a methyl radical, a chloromethyl radical containing from 2 to 3 chlorine atoms attached to the carbon atom of the said chloromethyl radical, and a chlorine atom, and (2) with their polysiloxane (Si-O-Si) hydroylsis products wherein the methylchlorosilane employed in the hydrolysis of the latter with water to the polysiloxane state corresponds to a chloromethylchlorsilane described above in (1) containing from 2 to 3 silicon-bonded chlorine atoms.

The compounds of this invention may be described as methylchlorosilanes in which all of the silicon valences are satisfied by methyl groups or chlorine atoms and in which all or part of the hydrogen atoms of the methyl groups have been replaced by chlorine. Examples of such chloromethylchlorosilanes are:

Methyldichloromethyldichlorosilane

Trichloromethyltrichlorosilane CCl₃SiCl₃
Methyltrichloromethyldichlorosilane

Dimethyldichloromethylchlorosilane

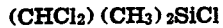

The compounds covered by the present invention may be used for diverse purposes. For example, many of them may be employed as intermediates in the preparation of organo-silicon polymers (organo polysiloxanes) whereby advantage may be taken of the fact that the chlorine atoms present in the methyl groups impart added flame resistance to the polymeric materials. The polysiloxanes prepared from the more highly chlorinated compounds, that is, the compounds containing two or more chlorine atoms on one methyl group, can be further polymerized by heat due to the fact that the chlorine atoms present in CHCl₂ and CCl₃ groups are highly reactive when these groups at attached to silicon. Advantage can be taken of this property to effect further cross-linking of the more highly chlorin-

2 ated materials. The novel chloromethylchlorosilanes and their hydrolysis products may also be employed as intermediates in the preparation of other derivatives by replacing the chlorine on the methyl groups by amino, carboxyl, hydroxyl or other groups.

Various methods can be employed in the preparation of the chloromethylchlorosilanes of this invention. The compounds are preferably prepared by reacting chlorine with the liquid methylchrolosilane, such as monomethyltrichlorosilane, dimethyldichlorosilane, or methyltrichlorosilane under the effect of ultra violet radiation or in the presence of a chlorinating catalyst, or both. Alternatively, the chlorination of the methylchlorosilane may be carried out in the vapor phase, for example, by passing a mixture of the two reactants in the vapor phase through a heated tube. The following specific examples illustrate each of these methods and specifically describe certain of the chloromethylchlorosilanes obtainable in accordance with my invention.

Example 1

A mixture of 198 parts by weight of dimethyldichlorosilane and 0.4 part anhydrous ferric chloride was subjected to ultraviolet radiation in a container closed to the atmosphere and a stream of chlorine gas was passed through the mixture for about seven hours while maintaining the temperature around 45–60° C. At the end of this time the increase in weight of the reaction mixture indicated that 45 parts by weight of chlorine had been absorbed. When the reaction mixture was subjected to fractional distillation, two principal fractions were obtained. The first, collected between 98° and 155°, was a clear, colorless liquid found to consist primarily of methyl-(dichloromethyl) dichlorosilane. The second fraction, collected between 160° and 183° C., consisted of both crystals and liquid and was identified as consisting essentially of methyl-(trichloromethyl) dichlorosilane. A portion of the second fraction was hydrolyzed to give a viscous, tacky, liquid polysiloxane hydrolysis product having a pungent odor. On being heated at 160° C. for three hours, this material gave off hydrogen chloride with further cross-linking to form a tacky, thermoplastic mass containing only 31 per cent chlorine attached to methyl groups. With further heating, additional hydrogen chloride was given off and the material became less flexible. The liquid condensation product would not burn, showing that the introduction of the chlorine atoms materially reduces the flammability of such organo-silicon polymers.

*Example 2*

The vapor phase chlorination of dimethyldichlorosilane was accomplished by passing a mixture of the chlorosilane in the vapor state and chlorine gas through a glass tube packed with copper gauze heated to an elevated temperature. Fractionation of the condensed products obtained from this reaction resulted in the isolation of trichloromethyltrichlorosilane. Hydrolysis of this material and subsequent warming of the reaction mixture gave chloroform and silica instead of the expected trichloromethylpolysiloxane.

*Example 3*

Ten mols of dimethyldichlorosilane was placed in a 2-liter, 3-necked flask and subjected to ultraviolet radiation. The flask was provided with a gas-inlet tube, a mechanical agitator, a thermometer, and a dry-ice cooled reflux condenser, the outlet of which was connected to a water scrubber. After sweeping the apparatus for ten minutes with nitrogen, chlorine was introduced in a rapid stream through the inlet tube. Hydrogen chloride gas was evolved. The flask was externally cooled in an ice bath and the temperature of the reactants maintained at 20–40° C. When the scrubber had absorbed 320 g. (8.8 mols) of HCl the chlorine was stopped. The product in the flask weighted 1598 g., an increase in weight of 308 g., which is equivalent to the substitution of 8.7 gram atoms of chlorine. The product was fractionally distilled in a column of about 20 theoretical plates. Two fractions were obtained: one (A) boiling at 122°, and one (B) at 150° besides unchanged starting material and residue. The residue was distilled at reduced pressure and another fraction (C) was obtained boiling at 109°/150 mm. Fraction (A) was found to be methyl(chloromethyl)dichlorosilane. This compound and other monochlorinated methyl silanes are specifically described and claimed in the copending application of John R. Elliott and Robert H. Krieble Serial No. 592,290, filed concurrently herewith and assigned to the same assignee as this present invention.

Fraction B was redistilled at reduced pressure in a column of about 15 theoretical plates. Practically all of the material boiled at 107.2 to 107.8° C./225 mm. A portion of this distillate boiling at 107.5° C./225 mm. was analyzed and found to be one of the two possible dichlorinated dimethyldichlorosilanes: $(CH_2Cl)_2SiCl_2$ or

$(CHCl_2)(CH_3)SiCl_2$.

Five cc. of the compound boiling at 107.5° C./225 mm. was hydrolyzed by shaking with 20 ml. of water. The water was decanted and the oily product placed in a 30 cc. distilling flask equipped with a dropping funnel and a dry ice-cooled receiver. Five cc. of 40% aqueous KOH was added slowly through the dropping funnel and the reactants were warmed in order to split off any highly chlorinated groups in accordance with the process described and claimed in the copending application of John R. Elliott and Robert H. Krieble, Ser. No. 592,291 (now U. S. Patent 2,457,539, issued December 28, 1948), which application was filed concurrently herewith and assigned to the same assignee as the present invention. The gas which was evolved was condensed to a liquid in the receiver. About 1.5 to 2.0 ml. of distillate was collected. After drying over $CaCl_2$ the distillate was analyzed and found to be methylene chloride. The production of methylene chloride from the hydrolyzate shows that both non-hydrolyzable chlorines were attached to the same carbon atom. This material was thus methyldichloromethyldichlorosilane.

Fraction C was a white crystalline solid, melting point 99°, boiling point 109°/150 mm. The crystals were analyzed for per cent hydrolyzable chlorine and was found to be a trichlorinated dimethyldichlorosilane. The analytical results were as follows:

Found, per cent hydrolyzable Cl, 30.53; calc. for $(Cl_3C_2H_3)SiCl_2$, 30.50. There are two possible isomers of the above composition, namely $(CHCl_2)(CH_2Cl)SiCl_2$ and $(CH_3)(CCl_3)SiCl_2$.

Two grams of this material was hydrolyzed by shaking with water, and the water decanted from the resulting oil. After washing, the oil was treated with 5 cc. of 40% KOH solution in a distillation flask equipped with a dry ice-cooled receiver. About ¾ cc. of non-aqueous distillate was collected after mild heating of the flask with a flame. This liquid was found to be chloroform. The cleavage of chloroform from the above compound shows that all the non-hydrolyzable chlorines were on the same carbon so that the compound isolated was methyl(trichloromethyl)-dichlorosilane, $(CH_3)(CCl_3)SiCl_2$.

As will be readily understood by those skilled in the art, when it is desired to produce the more highly chlorinated methylchlorosilanes or polysiloxanes other than those specifically described hereinbefore, the starting materials and chlorinating conditions are so chosen as to yield the desired products in accordance with the methods above given by way of illustration.

What I claim as new and desire to secure by Letters Patent of the United States, is:

1. Methyldichloromethyldichlorosilane.
2. Methyl(trichloromethyl)dichlorosilane.
3. The process which comprises reacting chlorine with a methylchlorosilane in which all of the valences of the silicon are satisfied by chlorine and —$CH_3$, said reaction being effected while subjecting the said methylchlorosilane to ultraviolet radiation.
4. The process of preparing a chloromethylchlorosilane which comprises passing chlorine gas into a mixture of ferric chloride and a methylchlorosilane in which all of the valences of the silicon are satisfied by chlorine and —$CH_3$, while said mixture is subjected to ultraviolet radiation.
5. The process of chlorinating a methylchlorosilane in which all of the valences of the silicon are satisfied by chlorine and —$CH_3$ which comprises subjecting a mixture of the vapor of said methylchlorosilane and chlorine to an elevated temperature.
6. The product of hydrolysis in a liquid hydrolysis medium consisting of water as the sole hydrolyzing agent of a methylchlorosilane consisting of a single silicon atom, two silicon-bonded chlorine atoms, and a silicon-bonded chloromethyl radical containing from 2 to 3 chlorine atoms attached to the carbon atom of the said chloromethyl radical, the remaining valence of the methylchlorosilane being satisfied by a member selected from the class consisting of a methyl radical, a chloromethyl radical containing from 2 to 3 chlorine atoms attached to the carbon atom of the said chloromethyl radical, and a chlorine atom.

7. A chloromethyl silicon composition selected from the class consisting of (1) methylchlorosilanes consisting of a single silicon atom, a silicon-bonded chlorine atom, and a silicon-bonded chloromethyl radical containing from 2 to 3 chlorine atoms attached to the carbon atom of the said chloromethyl radical, the two remaining valences of the methylchlorosilane being satisfied by members selected from the class consisting of a methyl radical, a chloromethyl radical containing from 2 to 3 chlorine atoms attached to the carbon atom of the said chloromethyl radical, and a chlorine atom, and (2) the products of hydrolysis of the compounds of (1) in a liquid hydrolyzing medium consisting of water as the sole hydrolizing agent, wherein the methylchlorosilane contains from 2 to 3 silicon-bonded chlorine atoms.

8. A methylchlorosilane consisting of a single silicon atom, a silicon-bonded chlorine atom, and a silicon-bonded chloromethyl radical containing from 2 to 3 chlorine atoms attached to the carbon atom of the said chloromethyl radical, the two remaining valences of the chloromethylsilane being satisfied by members selected from the class consisting of a methyl radical, a chloromethyl radical containing from 2 to 3 chlorine atoms attached to the carbon atom of the said chloromethyl radical, and a chlorine atom.

WILLIAM F. GILLIAM.

REFERENCES CITED

The following references are of record in the file of this patent:

UNITED STATES PATENTS

| Number | Name | Date |
|---|---|---|
| 2,253,219 | Rochow | Oct. 7, 1941 |
| 2,253,222 | Rochow | Oct. 7, 1941 |
| 2,384,384 | McGregor | Sept. 4, 1945 |

OTHER REFERENCES

Taylor, "Journal American Chemical Society," vol. 66, pgs. 842–843, May 1944.

Ushakov, "Chemical Abstracts," vol. 32, p. 2083 (1938).

Beilstein, "Handbuch der Org. Chem." 4th ed., vol. IV pgs. 625 and 629.